United States Patent
Wang et al.

(10) Patent No.: US 10,781,282 B2
(45) Date of Patent: Sep. 22, 2020

(54) FLAME RETARDANT POLYOL

(71) Applicant: Dow Global Technologies LLC, Midland, MI (US)

(72) Inventors: Beilei Wang, Shanghai (CN); Yi Zhang, Witchita, KS (US); Hongyu Chen, Zhanjiang (CN); Renhua Fan, Shanghai (CN); Min Yang, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 29 days.

(21) Appl. No.: 15/505,675

(22) PCT Filed: Nov. 5, 2014

(86) PCT No.: PCT/CN2014/090340
§ 371 (c)(1),
(2) Date: Feb. 22, 2017

(87) PCT Pub. No.: WO2016/070359
PCT Pub. Date: May 12, 2016

(65) Prior Publication Data
US 2017/0247496 A1    Aug. 31, 2017

(51) Int. Cl.
*C08G 18/32* (2006.01)
*C08G 18/48* (2006.01)
(Continued)

(52) U.S. Cl.
CPC ........... *C08G 18/329* (2013.01); *C08G 18/14* (2013.01); *C08G 18/1808* (2013.01);
(Continued)

(58) Field of Classification Search
CPC .. C08G 18/329; C08G 18/14; C08G 18/1808; C08G 18/1816; C08G 18/25;
(Continued)

(56) References Cited

U.S. PATENT DOCUMENTS 4,511,688 A    4/1985  Termine et al.
4,797,429 A *  1/1989  Thorpe .............. C08G 18/5033
                                                521/163
(Continued)

FOREIGN PATENT DOCUMENTS

EP    0237270 A2    9/1987
GB    1450702 A *  9/1976   ......... C07D 295/185
(Continued)

OTHER PUBLICATIONS

Antony et al., Synthesis and Thermal Characterization of Chemically Modified Cardanol Polymers, Journal of Applied Polymer Science, 1993, pp. 2129-2135.
(Continued)

*Primary Examiner* — Michael L Leonard

(57) ABSTRACT

A reaction system, such as for forming a rigid polyurethane foam, includes a flame retardant polyol that is a brominated reaction product of a cardanol component, a bromine component, and an additive component. The cardanol component includes at least 80 wt % of cardanol, based on the total weight of the cardanol component, and the bromine component including at least 80 wt % of bromine, based on the total weight of the bromine component.

10 Claims, 1 Drawing Sheet

(51) Int. Cl.
| | |
|---|---|
| *C08J 9/14* | (2006.01) |
| *C08G 18/18* | (2006.01) |
| *C08G 18/50* | (2006.01) |
| *C08G 18/54* | (2006.01) |
| *C08G 18/76* | (2006.01) |
| *C08G 18/40* | (2006.01) |
| *C08G 18/38* | (2006.01) |
| *C08G 18/08* | (2006.01) |
| *C08G 18/66* | (2006.01) |
| *C08J 9/12* | (2006.01) |
| *C08G 101/00* | (2006.01) |

(52) U.S. Cl.
CPC ..... *C08G 18/1816* (2013.01); *C08G 18/1825* (2013.01); *C08G 18/3209* (2013.01); *C08G 18/3215* (2013.01); *C08G 18/3271* (2013.01); *C08G 18/381* (2013.01); *C08G 18/4027* (2013.01); *C08G 18/482* (2013.01); *C08G 18/4816* (2013.01); *C08G 18/5024* (2013.01); *C08G 18/544* (2013.01); *C08G 18/6688* (2013.01); *C08G 18/7664* (2013.01); *C08G 18/7671* (2013.01); *C08J 9/125* (2013.01); *C08J 9/127* (2013.01); *C08J 9/144* (2013.01); *C08G 2101/005* (2013.01); *C08G 2101/0025* (2013.01); *C08J 2203/10* (2013.01); *C08J 2203/142* (2013.01); *C08J 2203/182* (2013.01); *C08J 2205/10* (2013.01); *C08J 2375/04* (2013.01); *C08J 2375/12* (2013.01)

(58) Field of Classification Search
CPC ............ C08G 18/3209; C08G 18/3215; C08G 18/3271; C08G 18/381; C08G 18/4027; C08G 18/4816; C08G 18/482; C08G 18/5024; C08G 18/544; C08G 18/6688; C08G 18/7664; C08G 18/7671
See application file for complete search history.

(56) References Cited

U.S. PATENT DOCUMENTS

| | | |
|---|---|---|
| 6,051,623 A | 4/2000 | Stielau |
| 7,244,772 B2 | 7/2007 | Ittara et al. |
| 7,393,465 B2 | 7/2008 | Niesten et al. |
| 7,722,696 B2 | 5/2010 | Winter et al. |
| 7,812,101 B2 | 10/2010 | Fenn et al. |
| 8,378,135 B2 | 2/2013 | Prasad et al. |
| 2005/0192423 A1 | 9/2005 | Niesten et al. |
| 2006/0004115 A1* | 1/2006 | Ittara ............... C08G 18/36 521/155 |
| 2009/0292099 A1* | 11/2009 | Garrett ............ C08G 18/10 528/80 |
| 2013/0036940 A1 | 2/2013 | Tanaka et al. |

FOREIGN PATENT DOCUMENTS

| | | |
|---|---|---|
| IN | 200503484 | 10/2009 |
| WO | WO-2011/003446 A1 | 1/2011 |
| WO | WO-2013/095992 A2 | 6/2013 |

OTHER PUBLICATIONS

Ghatge et al., Synthesis of Polyurethane Rigid Foams from Cardanol, Indian Journal of Technology, 1985, pp. 195-197.
PCT/CN2014/090340, International Search Report dated May 12, 2016.
PCT/CN2014/090340, International Preliminary Report on Patentability dated May 9, 2017.
PCT/CN2014/090340, Written Opinion of the International Searching Authority dated May 12, 2016.
Attanasi, et al., "Tetrabromo Hydrogenated Cardanol: Efficient and Renewable Brominating Agent", Organic Letters, 2006, 4291-4293.
Shishlov, et al., "Synthesis of Brominated Cardanol Derivatives and Their Effeciency as Fire Retardants for Wood", Polymer Science, 2014, 47-55.

* cited by examiner

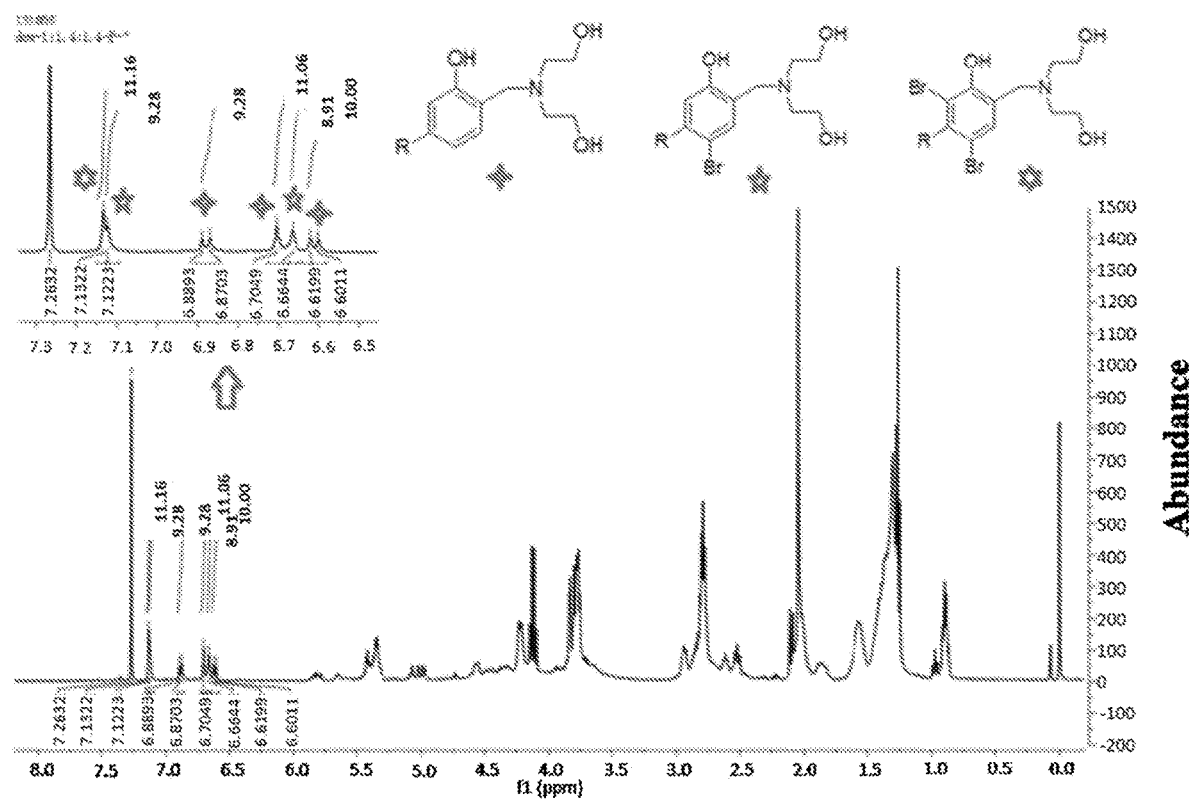

FLAME RETARDANT POLYOL

FIELD

Embodiments relate to a flame retardant polyol that is prepared using cashew nutshell liquid, methods of manufacturing thereof, and rigid polyurethane foams prepared therefrom.

INTRODUCTION

A need exists for new products that will enable the producers of polyurethane foam to meet stringent municipal building codes and fire regulations. As discussed in U.S. Pat. No. 4,511,688, several approaches have been taken to reduce flammability of rigid polyurethane foams. These approaches fall into two main categories: (1) the use of polyurethane-modified isocyanurates, which may use minimal amounts of flame retardants, and (2) the use of rigid polyurethanes, which may use relatively higher amounts of flame retardant materials. However, these approaches may suffer from processing constraints and/or shortcomings in foam physical properties. For example, halogenated flame retardants tend to be solids or high viscosity liquids. Polyurethane manufacturers may not have the handling capability for such halogenated flame retardants and/or handling of such materials may be challenging. Thus, new flame retardant products that have relatively lower viscosities (such as low viscosity liquids) that can be easily incorporated into existing processing equipment and/or relatively easier to handle.

Further, it has been suggested that petrochemical derived polyols may be substituted with natural oil/plant derived polyols such as polyols derived from cashew nutshell liquid, e.g., as discussed in U.S. Pat. No. 7,244,772. However, a need still exists for a polyol that combines flame retardancy, low viscosity, and derivation from a plant derived source.

SUMMARY

Embodiments may be realized by providing a reaction system that includes a flame retardant polyol that is a brominated reaction product of a cardanol component, a bromine component, and an additive component. The cardanol component includes at least 80 wt % of cardanol, based on the total weight of the cardanol component, and the bromine component including at least 80 wt % of bromine, based on the total weight of the bromine component. The reaction system may be used to prepared a rigid polyurethane foam, such as for use in appliances.

BRIEF DESCRIPTION OF THE DRAWINGS

FIG. 1 illustrates an exemplary $^1$H-NMR depicting the structural formulas 1Br—C-M and 2Br—C-M, as discussed in the Examples.

DETAILED DESCRIPTION

Rigid polyurethane foam may be used in appliance and construction applications, e.g., so as to provide excellent thermal insulation property. In such applications there may be strict requirements with respect to flame retardancy. Previously, the use of organic flame retardants additives have been proposed to improve flame retardancy. However, these additives may deteriorate physical properties of the resultant foam product. A flame retardant polyol that combines flame retardant properties and a plant derived materials has been proposed. The reactive flame retardant polyol may offer both improved flame retardant performance while maintaining and/or improving physical properties of the resultant foam product.

The flame retardant polyol may be used in foam, coating, adhesive, sealant, and/or elastomeric applications that seek improved fire retardancy/fire behavior. The flame retardant polyol may be used as a reactive component within a polyurethane based reaction system, such that the flame retardant polyol introduces flame retardancy in the form of a reactive component. The reactive flame retardant polyol may offer both improved flame retardant performance while maintaining and/or improving physical properties of the resultant foam product.

For example, the flame retardant polyol may be used to prepare a rigid polyurethane foam product (e.g., a rigid polyurethane foam for use in appliances and building materials) or a coating. The rigid polyurethane foam may be prepared by reacting an isocyanate component (that includes at least one isocyanate such as a polyisocyanate or an isocyanate-terminated prepolymer) and an isocyanate-reactive component that includes at least the flame retardant polyol. In addition to the flame retardant polyol, the isocyanate-reactive component may include one or more other polyols such as propylene oxide, ethylene oxide, and/or butylene oxide based polyols, and/or different natural oil/plant derived polyols.

Formation of Flame Retardant Polyol

The flame retardant polyol is prepared as a brominated reaction product of at least a cardanol component, a bromine component, and an additive component. The cardanol component includes at least 80 wt % of cardanol, based on the total weight of the cardanol component, and the bromine component includes at least 80 wt % of bromine, based on the total weight of the bromine component. The additive component may include an aminoalcohol, aldehyde, and/or ketone. For example, the additive component may include, in addition to the aminoalcohol, at least one selected from an aldehydes and ketones (such as formaldehyde, acetaldehyde, acetone, and/or blends thereof). The aldehydes and/or ketones may react with phenol via Mannich reaction. The flame retardant polyol may contain a bromine, a benzyl group, and an amines, which may demonstrate good/improved flame retardancy performance in polyurethane foams. Further, the hydroxyl groups in the polyol backbone may help increase the foam strength and/or demonstrate better compressive strength.

The cardanol component for forming the flame retardant polyol is a natural oil/plant derived material. The cardanol component includes a majority part of cardanol, e.g., provided in the form of cashew nutshell liquid also referred to as CNSL. The cardanol component may include one or more CNSLs. Cardanol may be referred to as a monohydroxyl phenol having a long hydrocarbon chain in the meta position. An exemplary structure of cardanol is a phenol containing one hydroxyl group, and an aliphatic side chain $R_1$ in the meta-position, as shown in the Formula (I), below,

(Formula I)

wherein, $R_1$ is —$C_{15}H_{25}$, —$C_{15}H_{27}$, or —$C_{15}H_{29}$.

The CNSL in the cardanol component may be a by-product of cashew nut processing (e.g., may be extracted from a layer between a nut and a cashew nut). The concentration of cardanol in the CNSL may be, at least 10 wt %, at least 50 wt %, at least 80 wt %, at least 85 wt %, and/or at least 90 wt %, based on the total weight of the CNSL. At the same time, the concentration of cardanol may be 99 wt % or less, 97 wt % or less, or 96 wt % or less, based on the total weight of the CNSL. In embodiments, the cardanol component has a cardanol content of at least 80 wt % (e.g., from 81 wt % to 100 wt %, from 85 wt % to 100 wt %, from 90 wt % to 100 wt %, from 92 wt % to 100 wt %, from 92 wt % to 97 wt %, and/or from 94 wt % to 96 wt %, etc.), based on a total weight of the cardanol component. The cardanol component and/or CNSL may be subjected to a heating process (e.g., at the time of extraction from the cashew nut), a decarboxylation process, and/or a distillation process.

According to embodiments, CNSL includes cardanol as a primary component and may additionally include cardol, methylcardol, and/or anacardic acid as secondary components. The secondary components may include monols and/or polyols, as shown below in the corresponding structural formulas

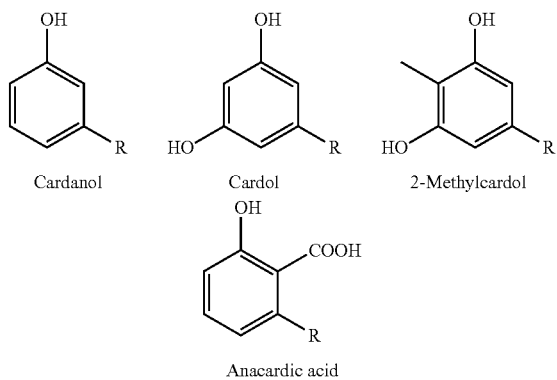

Cardanol    Cardol    2-Methylcardol

Anacardic acid

Whereas, R in each of the above structural formulas is independently represented by one of the following.

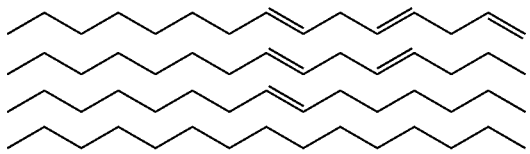

In exemplary embodiments, approximately 35% to 50%, of the total number of R groups in the cardanol component, may be represented by the first structural formula (i.e., the formula having three carbon-carbon double bonds). Approximately, 15% to 30%, of the total number of R groups in the cardanol component, may be represented by the secondstructural formula (i.e., the formula having two carbon-carbon double bonds). Approximately 25% to 45%, of the total number of R groups in the cardanol component, may be represented by the third structural formula (i.e., the formula having one carbon-carbon double bond). Approximately less than 5 wt %, of the total number of R groups in the cardanol component, may be represented by the fourth structural formula (i.e., the saturated formula having no carbon-carbon double bond).

The concentration of cardol in the at least one CNSL used in the cardanol component may be, based on the total weight of the at least one CNSL, about 0.1 wt % or more, about 1 wt % or more, or about 5 wt % or more; and at the same time, about 90 wt % or less, about 50 wt % or less, or about 10 wt % or less. Further, the CNSL may include minor concentrations of other materials such as anacardic acid, oligomers of cardanol, oligomers of cardol, and mixtures thereof. The total concentration of the other materials present in the CNSL may be less than about 10 wt %.

Exemplary CNSL of the cardanol component is available, e.g., from HDSG Beijing Technology under the tradename F-120 series or F-180 series and from HuadaSaigao [Yantai] Science & Technology Company Limited.

The bromine component includes at least 80 wt % of bromine. The bromine may be provided in glacial acetic acid (HOAc). For example, the weight ratio of bromine to HOAc or any comparable solvent for introducing the bromine in may be from 4:1 to 20:1. The bromine used may be sealed with water to reduce and/or minimize evaporation of the bromine. In doing so trace amounts of $Br_2$ may react with water ($Br_2+H_2O=HBr+HBrO$), and the glacial acetic acid may be added to minimize/inhibit the reaction. The bromine component may consist essentially of bromine and HOAc or any comparable solvent for introducing the bromine therewithin.

The additive component an aminoalcohol and/or paraformaldehyde. The additive component may additional include at least one solvent such as water and/or an acid neutralizer. A ratio of the aminoalcohol and the paraformaldehyde may be from 0.8 to 1.5.

A ratio of the bromine component to the cardanol component may be from 1.5 to 3.5. A ratio of the bromine component to the aminoalcohol may be from 0.8 to 3.0. A ratio of the bromine component to the paraformaldehyde may be from 0.8 to 3.0.

The reaction system for forming the flame retardant polyol may further include an optional phenol or phenol derivative component. The optional phenol or phenol derivative component includes at least one phenol and/or at least one phenol derivative. The reaction mixture may include the optional phenol or phenol derivative component at a molar ratio from 0.5:1.5 to 1.5:0.5 (e.g., 0.8:1.2 to 1.2:0.8, 0.9:1.1 to 1.1:0.9, etc.) for the moles of the phenol or phenol derivative to the moles of the cardanol component in the reaction mixture. For example, the molar amount of the cardanol component used may be reduced based on the molar amount of the phenol or phenol derivative used. Exemplary phenol derivatives include a naphthol based compound, a phenylphenol based compound, and a hexachlorophene based compound.

With respect to forming the flame retardant polyol, the process may include at least two stages. In a first stage, the additive component (e.g., that includes an aminoalcohol and paraformaldehyde) is heated to a temperature of at least 70° C. (e.g., from 75° C. to 150° C., from 75° C. to 125° C., from 80° C. to 120° C., and/or from 85° C. to 105° C.) After at least one hour (e.g., from 1.5 hours to 10.0 hours, and/or from 1.5 hours to 4.0 hours) the cardanol component is added to the heated mixture having the additive component therein. The resultant mixture is allowed to react, e.g., for at least 1.0 hour (e.g., from 1.5 hours to 12.0 hours, from 2.0 hours to 8.0 hours, from 3.0 hours to 7.0 hours, and/or from 5.0 hours to 7.0 hours). In a second stage, the bromine component is added to the reacted resultant mixture from the first stage. The bromine component may be added in a drop-wise method. The resultant brominated mixture may be allowed to react for at least 1.0 hour (e.g., from 1.5 hours to 96 hours, from 12.0 hours to 84 hours, from 24 hours to 72 hours, from 35 hours to 55 hours, and/or from 40 hours to 50 hours).

For example, the formation the flame retardant polyol has the following two stages: (1) prepare Cardanol Mannich Base Polyol (CMBP) by using decarboxylated CNSL, diethanolamine (DEA), and formaldehyde via Mannich reaction; and (2) brominate the CMBP at special ratio, the final FR polyol to form FR-CMBP.

Use of Flame Retardant Polyol

The flame retardant polyol may be used as part of an isocyanate-reactive component of a polyurethane system for forming a product such as a rigid polyurethane foam. The polyurethane system may be a one-component system or a two-component system. In the one-component system an isocyanate-terminated prepolymer may be prepared using the isocyanate-reactive component and one or more polyisocyanates. In the two-component system, the isocyanate-reactive component may be reacted with an isocyanate component that includes at least one isocyanate. The isocyanate component for the two-component system may include more polyisocyanates and/or one or more isocyanate-terminated prepolymers (of which isocyanate-terminated prepolymer may be prepared with or without using the flame retardant polyol).

In addition to the flame retardant polyol, the isocyanate-reactive component may include additional polyol(s) and/or additive(s). The isocyanate-reactive component may include from 5 wt % to 30 wt % of the flame retardant polyol, at least 50 wt % of a polyol component, and any optional remainder may be accounted for with one or more additives, based on a total weight of the isocyanate-reactive component. The polyol component of the isocyanate-reactive component includes at least one polyol different from the flame retardant polyol. For example, the polyol component may include from 30 wt % to 70 wt % of at least one high functional polyether polyol having a nominal average hydroxyl functionality of at least 5, based on the total weight of the isocyanate-reactive component. The polyol component may include from 10 wt % to 35 wt % of at least one low functional polyether polyol having a nominal average hydroxyl functionality from 2 to 4.

Exemplary additives include a curative agent, a catalyst, a surfactant, a plasticizer, a filler, a solvent, a hardener, a chain extender, a crosslinker, and/or additives known in the art for use in polyurethane products (such as rigid polyurethane foams). Based on the desired viscosity of the polyurethane system, a solvent (e.g., toluene) may be included as an additive. The solvent may be a low vapor pressure solvent that will evaporate in the curing process and/or will essentially not influence or may improve the mechanical properties of the final cured composition. Exemplary catalysts include catalysts include tertiary amines, Mannich bases formed from secondary amines, nitrogen-containing bases, alkali metal hydroxides, alkali phenolates, alkali metal alcoholates, hexahydrothiazines, and organometallic compounds. The catalyst may be added, in amount from 0.001 wt % to 10 wt %, based on the total weight of the polyurethane system. The catalyst may accelerate the curing time of isocyanate moieties (maybe in the isocyanate component or in prepolymers) and active hydrogens (maybe polyols and/or chain extenders) to offer mechanical properties. Dyes and/or pigments (such as titanium dioxide and/or carbon black), may be included in the additive component to impart color properties to the polyurethane products. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane coating.

In exemplary embodiments, the additive component (or the polyurethane system as a whole) may exclude reaction any solid flame retardants, liquid flame retardants, and flame retardant blends. For example, the only flame retardant in the polyurethane system may be included as part of the reactive flame retardant polyol. In exemplary embodiments, a polyurethane rigid foam may meet strict requirements with respect to flame retardancy for appliances without the use of organic flame retardants additives such as Tri(2-chloropropylene), also known as TCPP, and Triethylphosphate, also known as TEP.

With respect to the one and two-component polyurethane systems, the isocyanate refers to a polyisocyanate (e.g., at least one polyisocyanate) and/or an isocyanate-terminated prepolymer derived from at least one polyisocyanate (e.g., at least one isocyanate-terminated polyurethane based prepolymer). Exemplary polyisocyanates include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE.

For forming the polyurethane product (e.g., using the two-component system) an isocyanate index may be from 0.9 to 3.5. The isocyanate index is the equivalents of isocyanate groups (i.e., NCO moieties) present, divided by the total equivalents of isocyanate-reactive hydrogen containing groups (i.e., OH moieties) present. Considered in another way, the isocyanate index is the ratio of the isocyanate groups over the isocyanate reactive hydrogen atoms present in a formulation. Thus, the isocyanate index expresses the ratio of isocyanate actually used in a formulation with respect to the amount of isocyanate theoretically required for reacting with the amount of isocyanate-reactive hydrogen used in the formulation.

According to exemplary embodiments, a propylene oxide-glycerine based polyol, a poly(tetramethylene ether) glycol based polyol, a polypropylene glycol based polyol, and/or a polybutadiene based polyol may be used in the isocyanate-reactive component. Another exemplary polyol has a polyoxybutylene content of at least 50 wt % (e.g., a butylene oxide-propylene oxide polyol). For example, apropylene oxide based polyether (such as one available under the tradename VORANOL™ from The Dow Chemical Company), a natural oil derived polyol (such as castor oil), and/or a hydrophobic polyol such as one available under the tradename VORAPEL™ from The Dow Chemical Company may be used in the isocyanate-reactive component and/or in the isocyanate component to form a prepolymer.

All percentages are by weight, unless indicated otherwise. All values for molecular weight are based on number average molecular weight, unless indicated otherwise.

EXAMPLES

The following materials are principally used in the examples:

CNSL distillate A cashew nutshell liquid that includes greater than 95 wt % of cardanol (available from Huada-Saigao [Yantai] Science & Technology Company Limited as HD-9603).

PFA Paraformaldehyde, having a purity of 95% (available from Sinopharm Chemical Reagent Co., Ltd).

DEA Diethanolamine, having a purity of 98% (available from Sinopharm Chemical Reagent Co., Ltd).

Bromine Bromine, having a purity of 99% (available from Sinopharm Chemical Reagent Co., Ltd). The Bromine is provided in glacial acetic acid (HOAc) at a ratio of 1 mole of bromine (160 grams) to 20 mL (21 grams at a density of 1.05 g/mL) of HOAc.

$CCl_4$ Tetrachloromethane, having a purity of 99% (available from Sinopharm Chemical Reagent Co., Ltd).

Polyol A A sorbitol initiated propoxylated polyol, having a nominal average hydroxyl functionality of 6 and an approximate hydroxyl number of 480 mg KOH/gram (available from The Dow Chemical Company as VORANOL™ RN 482).

Polyol B A propoxylated ethylenediamine polyol, having a nominal average hydroxyl functionality of 4 and an approximate hydroxyl number of 640 mg KOH/gram (available from The Dow Chemical Company as VORANOL™ RA 640).

Polyol C A glycerine initiated propoxylated polyol, having a nominal average hydroxyl functionality of 3 and an approximate hydroxyl number of 160 mg KOH/gram (available from The Dow Chemical Company as VORANOL™ CP 1055).

FR Blend A flame retardant polyol blend that includes a flame retardant, a polyol, and a liquid phosphate ester such that there is a mixture of diester/ether diol of tetrabromophthalic anhydride and phosphate (available as a blend from Albemarle under the name SAYTEX® RB-79).

CAT 1 A N,N,N,N,N-Pentanmethyldiethylenetriamine based catalyst (available from Air Products as Polycat® 5).

CAT 2 A N,N-Dimethylcyclohexylamine based catalyst (available from Air Products as Polycat® 8).

CAT 3 A tris-2,4,6-dimethylamino-methyl-phenol based catalyst (available from Air Products as Dabco® TMR-30).

Surfactant A silicone surfactant (available from Dymatic [Dearmate] under the distinction AK8852).

BA 1 A hydrochlorofluorocarbon based blowing agent (available from DuPont as HCFC-141b).

BA 2 Water

Isocyanate A polymeric methylene diphenyl diisocyanate, i.e., PMDI (available from The Dow Chemical Company as PAPI™ 27).

Synthesis of Flame Retardant Cardanol Modified Brominated Polyols

Exemplary, flame retardant cardanol modified brominated polyol (FR-CMBP) structures are schematically presented by 1Br—C-M and 2Br—C-M (for which the structure may be confirmed by $^1$H-NMR, see FIG. 1), whereas the R is $C_{15}H_{31-n}$ in which n=0,2,4, or 6, as in understood based on the description of cardanol and cashew nutshell liquid. In particular, the FR-CMBP can be obtained in a two stage process.

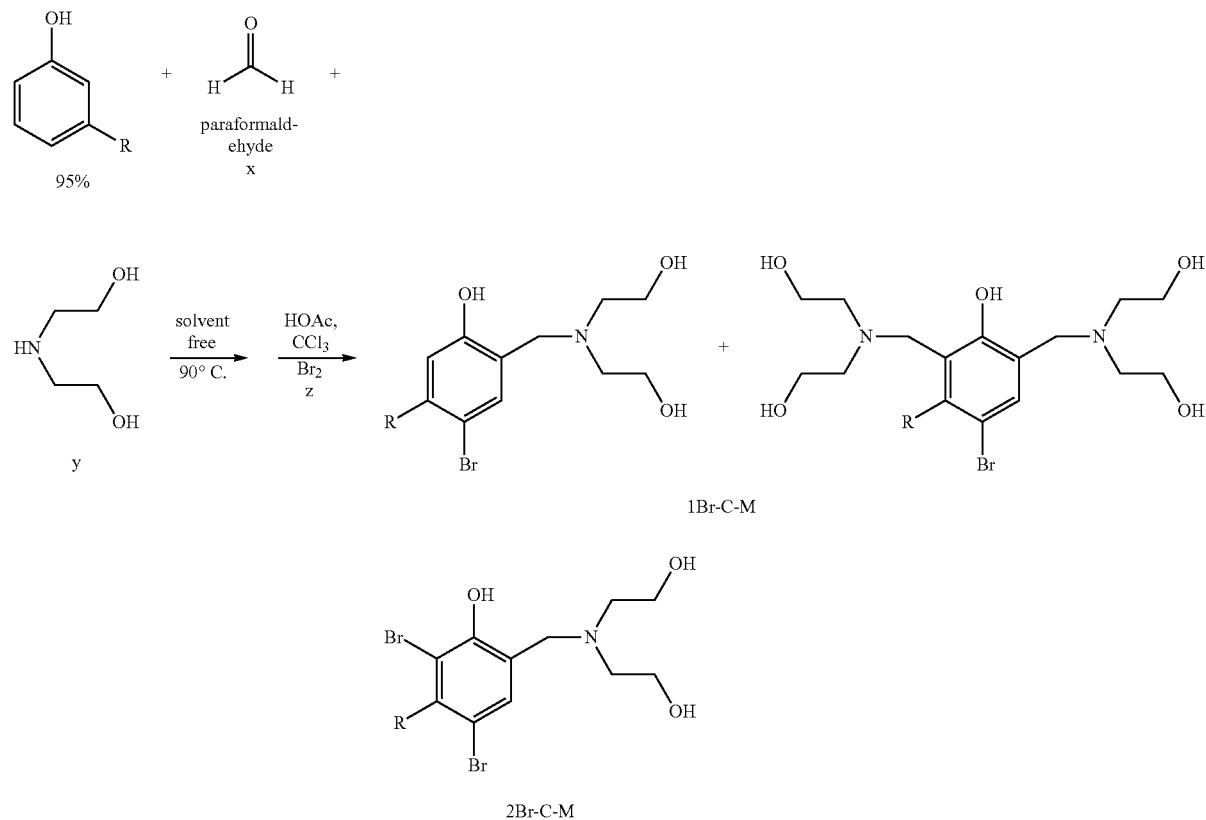

For the Examples, Working Examples of FR-CMBP 1, FR-CMBP 2 and FR-CMBP 3 are prepared using the respective approximate formulations in Table 1.

TABLE 1

|  | FR-CMBP 1 | FR-CMBP 2 | FR-CMBP 3 |
|---|---|---|---|
| Composition | | | |
| CNSL Distillate (equivalents) | 1.0 | 1.0 | 1.0 |
| PFA (equivalents) | 1.4 | 1.4 | 2.2 |
| DEA (equivalents) | 1.4 | 1.0 | 2.0 |
| Bromine (equivalents) | 2.2 | 2.2 | 2.2 |
| Composition Properties | | | |
| Equivalents Ratio of Bromine to DEA | 1.6 | 2.2 | 1.1 |
| Equivalents Ratio of Bromine to CNSL Distillate | 2.2 | 2.2 | 2.2 |
| Polyol Characteristics | | | |
| Hydroxyl Number (mg KOH/grams) | 182 | 166 | 149 |
| Viscosity (cps at 25° C.) | 8000 | 9800 | 9600 |

With respect to the two stage process, firstly, a mixture of PFA—paraformaldehyde (also referred to as x equivalent) and DEA—diethanolamine (also referred to as y equivalent) are heated to 90° C. in a round bottle flask. After 2 hours, the CNSL distillate is added into the heated mixture. After 6 hours the reaction is terminated and the reaction mixture in the bottle flask is cooled to room temperature. Secondly, $CCl_4$ is added as a solvent to the cooled bottle flask and a solution of the Bromine (also referred to as z equivalent) in HOAc (acetic acid) is added dropwise into the reaction system at room temperature. After completion of dropwise addition, the mixture is heated to reflux for 48 hours. The crude mixture is concentrated under reduced pressure, washed with water, extracted by ethyl acetate, and quenched with saturated sodium bicarbonate ($NaHCO_3$). Then, the resultant material is dried over anhydrous sodium sulphate and concentrated under reduced pressure to provide brominated cardanol.

Formation of Polyurethane Rigid Foam

Polyurethane foam samples are prepared for Working Examples 1, 2, and 3 and Comparative Example A, according to the respective approximate formulations in Table 2, below.

TABLE 2

|  | Example 1 | Example 2 | Example 3 | Comp. Example A |
|---|---|---|---|---|
| Isocyanate-Reactive Formulation (based on total weight of the isocyanate-reactive formulation) | | | | |
| FR-CMBP 1 | 9.0 | — | — | — |
| FR-CMBP 2 | — | 9.0 | — | — |
| FR-CMBP 3 | — | — | 9.0 | — |
| FR Blend | — | — | — | 9.0 |
| Polyol A | 46.9 | 46.9 | 46.9 | 46.9 |
| Polyol B | 3.7 | 3.7 | 3.7 | 3.7 |
| Polyol C | 18.5 | 18.5 | 18.5 | 18.5 |
| CAT 1 | 0.1 | 0.1 | 0.1 | 0.1 |
| CAT 2 | 0.9 | 0.9 | 0.9 | 0.9 |
| CAT 3 | 0.5 | 0.5 | 0.5 | 0.5 |
| Surfactant | 1.1 | 1.1 | 1.1 | 1.1 |
| BA 1 | 17.6 | 17.6 | 17.6 | 17.6 |
| BA 2 | 1.7 | 1.7 | 1.7 | 1.7 |
| Isocyanate Formulation | | | | |
| Isocyanate Index (based on inclusion of PAPI™ 27) | 1.2 | 1.2 | 1.2 | 1.2 |
| Polyurethane Foam Properties | | | | |
| Cream time (seconds) | 11 | 12 | 11 | 11 |
| Gel time (seconds) | 75 | 80 | 72 | 70 |
| Core Density (kg/m$^3$) | 41 | 39 | 35 | 37 |
| Compressive strength (kPa) | 282 | 278 | 249 | 228 |
| K-factor @ 23° C. | 20 | 20 | 19 | 19 |
| LOI (%) | 20 | 20 | 20 | 20 |

For measurement of cream time and gel time, a free rise bun was prepared to measure the system reactivity. Cream time is the time between the start of mixing the isocyanate component and the isocyanate-reactive component and the beginning of foam rise. Gel time is the time in which a foam forming reactive mixture will stick to a probe when introduced to the mixture and strings out from the mixture. Core density is measured as the inner density of molded foam and free rise density (FRD) is measured by the water replacement method. Compressive strength is measured according to ISO-844. Thermal conductivity (k-factor) is measured according to EN 12667. Limited Oxygen Index (LOI) is measured as a percentage according to GB/T 2406. LOI is the minimum concentration of oxygen, expressed as a percentage, that will support combustion of a material (required to sustain burning of a vertically mounted sample test trip). It is measured by passing a mixture of oxygen and nitrogen over a burning specimen, and reducing the oxygen level until a critical level is reached. Accordingly, the LOI is this is the test method of a material's flammability. A higher LOI value correlates to better flame retardant performance. For testing rigid polyurethane foam, samples are cut into 1 cm×1 cm×15 cm pieces that are fixed on a sample holder. Then, the samples are covered by a glass chamber with a hole in the top, and the sample is ignited from the top.

The invention claimed is:

1. A reaction system, comprising:
a flame retardant polyol that is a brominated reaction product of a cardanol component, a bromine component, and an additive component, the cardanol component including at least 80 wt % of cardanol, based on the total weight of the cardanol component, and the bromine component including at least 80 wt % of bromine, based on the total weight of the bromine component, wherein the additive component includes an aminoalcohol and at least one selected from an aldehyde and a ketone, wherein the flame retardant polyol is a flame retardant cardanol modified brominated polyol that is formed through two stages that include:
(1) preparing a Cardanol Mannich Base Polyol by using a decarboxylated cashew nutshell liquid, diethanolamine, and formaldehyde via Mannich reaction; and
(2) brominating the Cardanol Mannich Base Polyol to form the flame retardant cardanol modified brominated polyol.

2. The reaction system as claimed in claim 1, wherein the flame retardant cardanol modified brominated polyol structures are selected from the group consisting of monobromo-cardanol-Mannich base polyol (1Br-C-M), dibromo-cardanol-Mannich base polyol (2Br-C-M), and their combination.

3. The reaction system as claimed in claim 1, wherein:
a ratio of the bromine component to the cardanol component is from 1.5 to 3.5, and
a ratio of the bromine component to the aminoalcohol is from 0.8 to 3.0.

4. The reaction system as claimed in claim 1, further comprising an isocyanate component and an isocyanate reactive component, wherein:
the isocyanate component includes at least one isocyanate, the isocyanate index being from 0.9 to 3.5, and
the isocyanate-reactive component includes from 5 wt % to 30 wt % of the flame retardant polyol and at least 50 wt % of a polyol component that includes at least one polyol different from the flame retardant polyol, based on a total weight of the isocyanate-reactive component.

5. The reaction system as claimed in claim 4, wherein the polyol component includes from 30 wt % to 70 wt % of at least one high functional polyether polyol having a nominal average hydroxyl functionality of at least 5, based on the total weight of the isocyanate-reactive component.

6. The reaction system as claimed in claim 4, wherein the polyol component includes from 10 wt % to 35 wt % at least one low functional polyether polyol having a nominal average hydroxyl functionality from 2 to 4, based on the total weight of the isocyanate-reactive component.

7. The reaction system as claimed in claim 1, wherein the reaction system excludes any solid flame retardants, liquid flame retardants, and flame retardant blends.

8. A method of preparing a rigid polyurethane foam using the reaction system as claimed in claim 4.

9. A rigid polyurethane foam prepared using the reaction system as claimed in claim 4.

10. An appliance including a rigid polyurethane foam prepared using the reaction system as claimed in claim 4.

* * * * *